United States Patent [19]
Sorg et al.

[11] Patent Number: 5,536,291
[45] Date of Patent: Jul. 16, 1996

[54] METHOD FOR MELTING GLASS IN AND A GLASS MELTING FURNACE FOR THE PRACTICE OF THE METHOD

[75] Inventors: Helmut Sorg, Glattbach; Helmut Pieper, Lohr am Main, both of Germany

[73] Assignee: Beteiligungen Sorg GmbH & Co., Lohr am Main, Germany

[21] Appl. No.: 290,184

[22] Filed: Aug. 15, 1994

[30] Foreign Application Priority Data

Aug. 13, 1993 [DE] Germany ............... 43 27 237.1

[51] Int. Cl.$^6$ ................................................ C03B 5/20
[52] U.S. Cl. .................. 65/134.5; 65/134.6; 65/135.2; 65/178; 65/346; 65/347; 65/135.1
[58] Field of Search ................... 65/134.5, 139.6, 65/135.1, 135.6, 136.1, 136.3, 178, 346, 347, 135.2

[56] References Cited

U.S. PATENT DOCUMENTS

| | | | |
|---|---|---|---|
| 2,010,064 | 8/1935 | Drake | 65/347 |
| 2,042,852 | 6/1936 | Koupal | 65/347 |
| 2,300,427 | 11/1942 | Longenecker | 65/347 |
| 3,198,618 | 8/1965 | Penberthy | 65/135.1 X |
| 3,201,219 | 8/1965 | Frazier et al. | 65/347 |
| 3,294,512 | 12/1966 | Penberthy | 65/134.5 X |
| 3,321,288 | 5/1967 | Griem, Jr. | 65/135.1 X |
| 3,330,639 | 7/1967 | Boettner et al. | 65/134.5 X |
| 3,482,956 | 12/1969 | Trethewey | 65/134.5 X |
| 3,810,743 | 5/1974 | Rau et al. | 65/136.1 X |
| 4,544,396 | 10/1985 | Krumwiede et al. | 65/134.5 X |
| 4,789,990 | 12/1988 | Pieper | 373/32 |
| 4,852,118 | 7/1989 | Pieper | 373/32 |
| 4,882,736 | 11/1989 | Pieper | 373/32 |

FOREIGN PATENT DOCUMENTS

| | | |
|---|---|---|
| 0293545 | 2/1988 | European Pat. Off. |
| 806998 | 6/1951 | Germany |
| 806997 | 6/1951 | Germany |
| 700472 | 11/1979 | U.S.S.R. |
| 2162510 | 2/1986 | United Kingdom |
| 2204310 | 11/1988 | United Kingdom |

Primary Examiner—David L. Lacey
Assistant Examiner—Sean Vincent
Attorney, Agent, or Firm—Hill, Steadman & Simpson

[57] ABSTRACT

In a furnace for melting glass, a preheating zone, a melting zone, a refining zone with a refining bank raised above the rest of the floor and an homogenizing zone, are arranged lengthwise behind one another between the charging end for the glass raw materials and a throat for the molten glass. The furnace chamber formed between two end walls is split up by dividing walls with the exception of flow paths for the glass and waste gases. The melting zone, the refining zone, several burners and the homogenizing zone have a common combustion chamber in the superstructure. A first flow path "L1" for the glass is defined between the inside face of the first end wall and the vertical center line (E) of the final dividing wall in front of the refining zone, and a second flow path "L2" is defined in the combustion chamber between the vertical center line (E) and the inside face of the second end wall. The ratio of the length "L2" to the total length ("L1"+"L2") is chosen to be at least 0.5, preferably at least 0.53. The lengths "L1" and "L2" are the horizontal components of the corresponding flow paths. The greater part of the heating energy is supplied to the glass melt in front of the refining bank in the melting zone, and the heating and melting energy for the raw materials is applied from above from the waste gases, and from below solely from the current in the glass melt which extends as far as the charging end. Therefore, the charging end of the melter does not require any electrical heating, at least during continuous operation.

11 Claims, 3 Drawing Sheets

METHOD FOR MELTING GLASS IN AND A GLASS MELTING FURNACE FOR THE PRACTICE OF THE METHOD

BACKGROUND OF THE INVENTION

The invention relates to a method of melting glass in a melting furnace having a melting tank with a tank bottom and furnace superstructure with a furnace crown, which has:

- a preheating zone, a melting zone, a refining zone with a refining bank raised above the rest of the floor and an homogenizing zone, arranged lengthwise behind one another between the charging end for the glass raw materials situated near a first end wall and a second end wall, whereby

- at least one dividing wall protruding downwards from the crown is provided inside the furnace between the first end wall at the charging end and the melting zone to retain the flame radiation, whereby a flow path for the waste gases coming from the burners is provided so that the glass raw materials in the preheating zone can be heated, and

- the melting zone, the refining zone, several burners and the homogenizing zone are in a common combustion chamber in the superstructure, the two ends of which are defined by the last dividing wall and the inside face of the second end wall, and

- a first flow path of the glass, with a horizontal component of length "L1", is formed between the inside face of the first end wall and the vertical center line (E) of the aforementioned last dividing wall before the refining zone, and

- a second flow path of the glass, with a horizontal component of length "L2", is formed in the aforementioned combustion chamber between the vertical center line (E) of the aforementioned last dividing wall and the inside face of the second end wall, and whereby

- a current is produced from the melting zone in the direction of the charging end and a counterflow bottom current is produced by means of the creation of a temperature gradient in the glass melt through the addition of heating energy to the glass bath by means of burners installed in the combustion chamber.

A prior art method and the equipment for the practice of the method are disclosed by U.S. Pat. Nos. 4,882,736, 4,852,118 and 4,789,990. The main objective is to reduce the nitrogen oxide and dust content in the waste gases and simultaneously to increase the thermal efficiency. A main characteristic of this is the production of a temperature gradient in the glass melt, where the temperature increases between the charging end and the refining zone, as a result of the extremely intense heating of the glass melt by fossil fuel burners in the melting zone, which produces a current flowing from the melting zone to the charging end. By means of a further measure, the waste gases from the burners are transported above the contents of the furnace to the charging end, where they are passed through two lateral flue outlets to heat exchangers and then to a waste gas stack, and in conjunction with the current path produced by the internal dividing walls, the waste gases pass over the glass raw materials floating on the glass bath surface, and, so doing, transfer significant quantities of heat to the raw materials, which promotes and accelerates the melting. The waste gases therefore flow basically in counterflow to the glass raw materials, which consist of batch and/or cullet.

For this purpose, the fossil fuel burners are installed in the superstructure of a combustion chamber in which the melting zone, the refining zone which has a very shallow bath depth, and the homogenizing zone, which immediately follows the refining zone, and which has a significantly deeper bath depth, are also situated. The homogenizing zone leads to a throat for the glass melt in the direction of a working end. A number of the fossil fuel burners are installed above the very shallow refining zone, but this does not preclude the installation of further burners in front of a further dividing wall, which forms the end of the aforementioned combustion chamber in the direction of the charging end. The part of the furnace in front of this dividing wall in the direction of flow is described as the preheating zone. The complete length of the furnace is determined by the length of the preheating zone, the melting zone, the refining zone and the homogenizing zone.

In the prior art solution the length of the aforementioned combustion chamber, defined as being from the vertical center line of the upstream dividing wall to the inside face of the downstream end wall, is much less than 50% of the distance between the inside face of the end wall at the charging end and the inside face of the end wall at the other end of the furnace in the area of the throat. If the drawing is to scale, then the aforementioned combustion chamber with the fossil fuel burners, the melting, the refining and the homogenizing zones takes up approximately ⅓ of the total length of the furnace, while the preheating zone covers the remaining ⅔ of the length. This length ratio causes significant heat losses along the flow path of the glass in the preheating zone, so that the glass currents no longer transport sufficient heat in the direction of the charging end of the furnace. However, very large amounts of heat are required in exactly this area to heat the glass raw materials.

In order to solve this problem for equipment built according to the prior art solution, additional electrodes are installed in the bottom area of the charging end, by means of which the glass melt in the charging end is heated electrically in order to prevent the temperatures in this area from falling below a certain level, or even to prevent the glass melt from solidifying. However these electrodes are disadvantageous in that 1. they have an adverse effect on the investment and the furnace operating costs, since a suitable transformer is required, and expensive electrical energy is used, and 2. they produce an upwardly moving convection current in the glass melt, which is opposed to the current coming from the melting zone, and so do not assist this current.

SUMMARY OF THE INVENTION

An object of the present invention is therefore to improve the prior art method such that the advantages of the prior art furnaces, which are the reduction of the nitrogen oxide and the dust contents of the waste gases, are retained, while the investment and operating costs are further reduced.

This object is achieved by the method described above according to the invention in that:

- the ratio of the length of the horizontal component of the second flow path of the glass melt in the combustion chamber ("L2") to the combined lengths of the horizontal components of the first and second flow paths of the glass melt ("L1"+"L2") is chosen to be at least 0.5, and

- at least the greater part of the heating energy is introduced into the glass melt in the melting zone, and the heating and melting energy is added to the glass raw materials from the waste gases from above and from below solely from the currents in the glass melt which extend as far as the charging end.

The ratio L2:(L1+L2) should preferably be at least 0.53.

Therefore, with a given furnace total length, the invention results in an increase in the length of the combustion chamber which includes the fossil fuel burners, the melting zone, the refining zone and the homogenizing zone at the cost of the length of the front part of the furnace, the so-called preheating zone, so as to reduce the flow path for the current in the glass in the preheating zone. Furthermore the greater part of the energy from the fossil fuel burners is liberated in the melting zone in front of or upstream of the refining bank in the refining zone, i.e. at a location where the glass bath is still much deeper than above the refining bank. Finally, this results in the current in the glass melt extending right up to the charging end of the melting furnace, so that direct heat exchange can take place between the relatively hot glass and the raw materials charged at this location.

Surprisingly, it was found that these steps eliminated the necessity for additional electric heating in the bottom area of the charging end, so that the large investment for transformers etc. can be saved, and expensive electrical energy is not required, without producing inadmissible temperature reductions or even solidification of the melt.

It is particularly advantageous if the current is assisted by gas bubbles from at least one row of bubblers, installed perpendicular to the longitudinal axis of the furnace at a distance of 100 to 300 cm in front of the refining bank in the direction of flow.

It is also an advantage, if the amount of energy introduced into the melt near the bubblers is increased, by at least two burners installed opposite one another and above the at least one bubbler row, and which have a higher capacity than the other burners. An increase in the temperature difference between the batch charging area and the area in front of the refining bank assists the natural current which determines the energy transport below the batch layer. This also makes it possible to increase the absolute dimensions of the complete furnace.

The invention also relates to a furnace for melting glass with a melter, with a tank with a tank bottom and with a superstructure with a crown, which has a preheating zone, a melting zone, a refining zone with a refining bank raised above the rest of the floor and an homogenizing zone, arranged lengthwise behind one another between the charging end for the glass raw materials situated near a first end wall and a second end wall, whereby at least one dividing wall protruding downwards from the crown is provided inside the furnace between the first end wall at the charging end and the melting zone to retain the flame radiation, whereby a flow path for the waste gases coming from the burners is provided so that the glass raw materials in the preheating zone can be heated, and the melting zone, the refining zone, several burners and the homogenizing zone are in a common combustion chamber in the superstructure, the two ends of which are defined by the last dividing wall and the inside face of the second end wall, and a first distance "L1" is formed between the inside face of the first end wall and the vertical center line (E) of the aforementioned last dividing wall before the melting zone and the refining zone, and a second distance "L2" is formed in the aforementioned combustion chamber between the vertical center line (E) of the aforementioned last dividing wall and the inside face of the second end wall.

In order to achieve the object of the invention, a furnace according to the invention is characterized by the ratio of the second length "L2" in the combustion chamber to the combined lengths ("L1"+"L2") between the first and second end walls is a minimum of 0.5, the majority of the burners are installed in the area of the refining zone in front or upstream of the refining bank in the part of the melting zone where the glass bath is deeper, and the charging end of the melting tank is not electrically heated.

Preferably the ratio L2:(L1+L2) should be at least 0.53.

The advantages described above are obtained if these construction guidelines are followed. The furnace in question is a simple construction, and costs less to build and maintain as no transformers or electrodes are required for the charging end. However, most importantly, operating costs are lower. It should be further noted that in addition to the heating effect produced, the water cooling of the electrodes also produces heat losses, and that this disadvantage is eliminated by the subject of this invention.

It is a particular advantage if at least one bubbler row is installed in the tank 100 to 300 cm in front of the refining bank in the direction of flow.

It is a further advantage if at least two burners are installed opposite one another above the at least one bubbler row, whereby these burners have a higher heating capacity than the other burners. In this way the energy input around the bubblers is intensified. An increase in the temperature difference between the batch charging area and the area in front of the refining bank assists the natural current which determines the energy transport below the batch layer.

Further preferred embodiments of the subject of the invention are detailed below.

BRIEF DESCRIPTION OF THE DRAWINGS

An example of a construction of the subject of the invention and the method used are detailed in FIGS. 1 to 3.

The figures show.

DETAILED DESCRIPTION OF THE PREFERRED EMBODIMENTS

Figure 1:
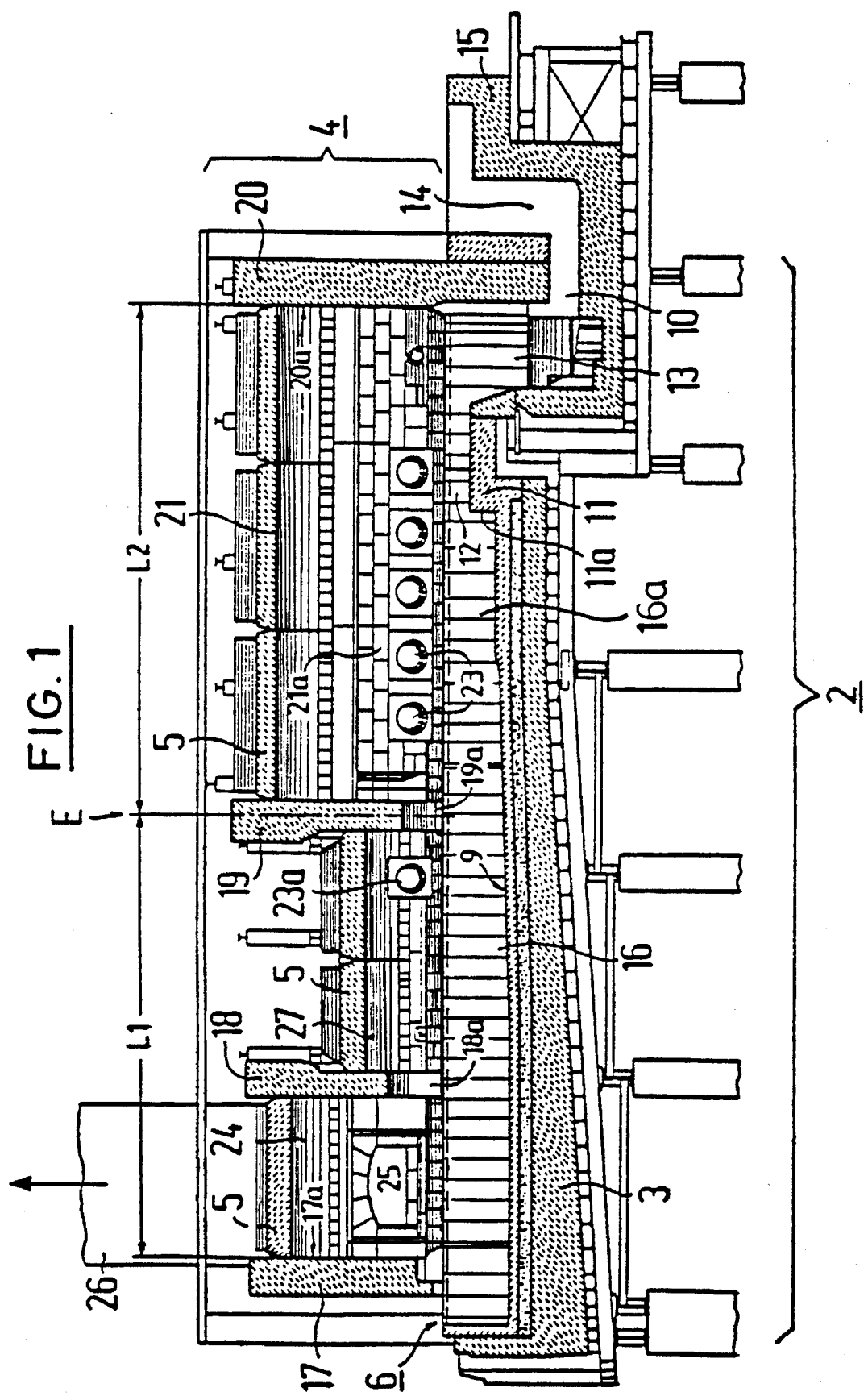
FIG. 1 is a vertical, longitudinal section on the main furnace axis.
Figure 2:
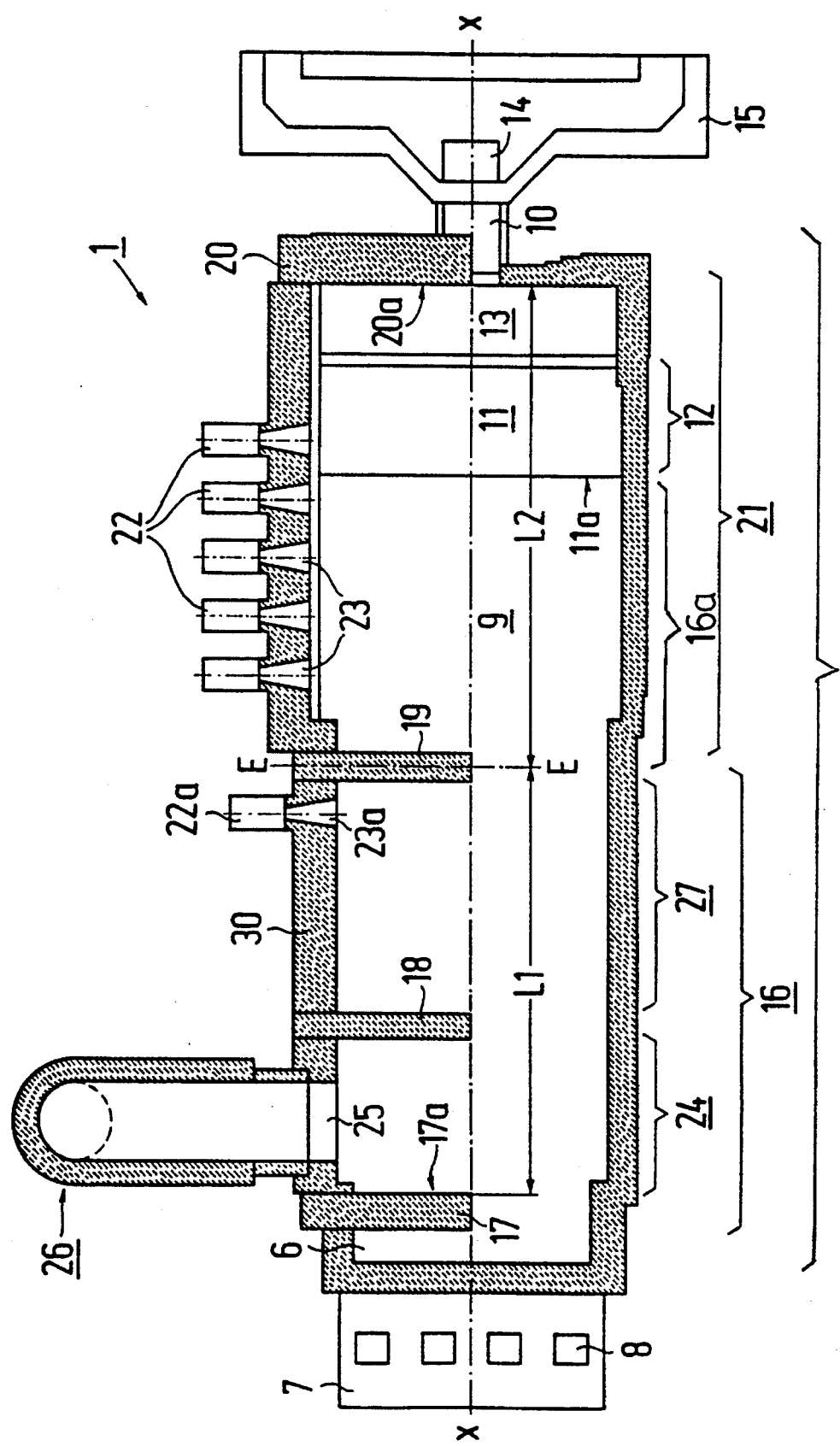
FIG. 2 are two horizontal, longitudinal sections, one above the longitudinal axis X-X through the superstructure with dividing walls and burners, and below the longitudinal axis X-X, through the furnace itself.

FIGS. 1 and 2 show a furnace 1, which comprises a melter 2 with a tank 3 and a superstructure 4 with a crown 5, which, as shown in FIG. 1, consists of several parts and can have a stepped construction.

The tank 3 has a charging end 6, at which at least one batch charger, which is not shown in the figure, is installed. In this special case, the raw materials are introduced across virtually the complete width of the melting tank 3, as indicated in FIG. 2, by a raw material bunker 7 with four raw material discharge outlets 8. Four batch chargers of a known design, which are not shown in the figure, are installed under the four discharge outlets.

The tank 3 has a tank bottom 9, in which a refining bank 11 is situated between the charging end 6 and a throat 10 for the molten glass, above which a refining zone 12 is created. The refining zone 12 is followed in the direction of the throat 10 by a homogenizing zone 13, which has its deepest point immediately in front of the throat 10. A riser 14 is connected to the throat 10, and leads into a working end 15 from below. Feeders or forehearths, which are not depicted here, are connected to the working end 15.

The superstructure 4 is constructed as follows. A first end wall 17 with an inside face 17a is situated approximately above the charging end 6. Thereafter, a first dividing wall 18 and a second dividing wall 19 are situated some distance apart, whereby a vertical center line E of the second dividing wall 19 is used for the subsequent definition of paths and distances. Waste gas openings 18a and 19a are provided in the lower ends of both dividing walls 18 and 19. The function of these waste gas openings will be explained hereafter. The part between the charging end 6 and the dividing wall 19 forms the so-called preheating zone 16, which is followed by the melting zone 16a, whereby it must be emphasized that the transition between the preheating 16 and the melting zone 16a is not rigid. The melting zone 16a extends as far as the refining zone 12.

A second end wall 20, with an inside face 20a, is situated above the throat 10. A combustion chamber 21 is formed between the second dividing wall 19 and the second end wall 20 and below the crown 5, in which the melting zone 16a, the refining bank 11 for the formation of the refining zone 12, and the homogenizing zone 13 are also located. Fossil fuel burners 22 are installed in each side wall 21a of the combustion chamber 21, whereby only the burner blocks 23 are shown in FIG. 1.

Therefore a number of burners 22 are installed in pairs in the combustion chamber 21, directly opposite one another and in mirror image along the X-X axis, whereby the burner axes indicated in FIG. 2 face one another and are aligned with one another. However, they can also be installed offset to one another.

As can be seen in FIGS. 1 and 2, several pairs of burners 22 are installed before or upstream of a front edge 11a of the refining bank 11 in the melting zone 16a, and only one burner pair is above the refining bank 11. Therefore the majority of the burners 22 in the melting zone 16a, are in front of the refining bank, i.e., in an area where the tank 3 is of much greater depth, being, for example, more than twice as deep in this area as in the refining zone 12, so that at this location an uninterrupted vertical flow in the glass melt from the tank bottom 9 towards the glass bath surface becomes possible.

A further waste gas chamber 24 is formed, as part of the charging end 6, between the first end wall 17 and the first dividing wall 18. Outlets 25 for the waste gases are installed symmetrically opposite one another in the side walls of this waste gas chamber 24. The waste gases are passed to a heat exchanger 26 for preheating of the combustion air. This relatively low level of preheating is one of the known reasons why such a furnace produces extremely low levels of nitrogen oxides. For the sake of simplicity the pipework for the supply of fuel and preheated combustion air to the burners 22 is not shown.

A further waste gas chamber 27 is formed above the preheating zone 16 between the first dividing wall 18 and the second dividing wall 19, in which a further pair of fossil fuel burners 22a can be installed near the second dividing wall, although this is not absolutely necessary. Again only the burner block 23a for this burner is shown in FIG. 1.

In the example described, the horizontal components of the flow paths, that is, the distances L1 and L2, are also of particular significance. The first distance L1 is defined as being between the inside face 17a of the first end wall 17 and the vertical center line E of the last dividing wall 19 in front of the refining zone 12, while the second distance L2 is defined as being in the aforementioned combustion chamber 21 between the vertical center line E of the last dividing wall 19 and the inside face 20a of the second end wall 20. The ratio of the second distance L2 in the combustion chamber 21 to the combined lengths of the first and second distances (L1+L2) between the inside faces 17a and 20a of the first and second end walls 17 and 20 is of particular significance. This ratio should be at least 0.5, preferably at least 0.53. This means that according to the above definition, the length of the combustion chamber 21 is at least half of the free total inside length of the furnace superstructure 4, which length can be expressed as the sum of L1 and L2.

As can be seen in FIGS. 1 and 2, the waste gases from the burners 22 are led back into the chamber 24, above the preheating zone 16, by means of a flow path which is defined by the waste gas openings 18a and 19a in the dividing walls 18 and 19. The two outlets 25 are located in this waste gas chamber 24, whereby only one is visible in each of the figures.

As the amount of raw materials present on the surface of the glass bath reduces in the flow direction between the charging end 6 and the second dividing wall 19, the raw materials are intensively heated from above by the counterflow of the waste gases described above, whereby the energy for heating the raw materials comes largely from the waste gases. The protruding dividing walls 18 and 19 prevent the burners from radiating into the colder preheating zone 16 to a large extent.

As a result of the relatively short horizontal component of the flow path, the distance L1, and of the extremely intensive heating of the glass melt in that part of the combustion chamber 21 which has a greater glass bath depth, an extremely intensive flow is produced in the glass melt, which extends back to the charging end 6. Only when it reaches the charging end 6 or the waste gas chamber 24, does the glass, which has gradually become colder, sink to the tank bottom 9 and then return to the area influenced by the burners 22, where an upward current exists.

Figure 3:
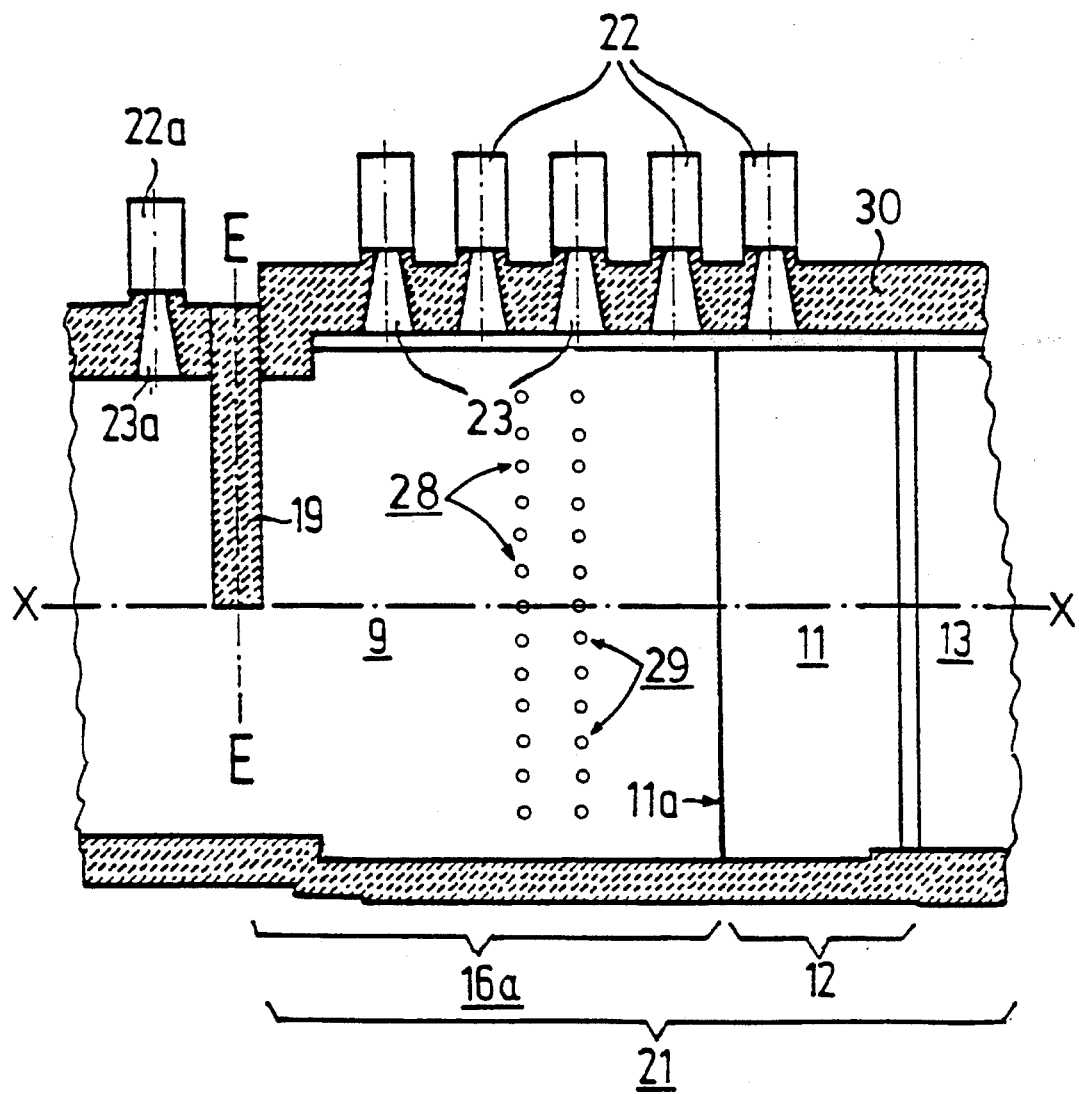
FIG. 3 is a partial section of FIG. 2 with the addition of bubblers installed in the tank bottom.

This convection current is assisted by the bubblers 28 shown in FIG. 3, which carry the cold glass from the bottom to the surface. The bubblers 28 and 29 are installed in one or two rows perpendicular to the furnace axis X-X or parallel to the front edge 11a of the refining bank 11 of the tank bottom 9, in an area which is between 100 and 300 cm in front of the front edge 11a. This produces large temperature differences between the glass bath and the flame, which increase the heat transfer to the glass bath.

Of course there is also a horizontal component, which is added to this circulating current, and which transports the glass from the charging end 6, through the melting zone 16a, the refining zone 12, the homogenizing zone 13 and the throat 10 to the working end 15. However, the total flow pattern eliminates the necessity to introduce additional heat into the area around the charging end 6, so that no electrodes are required, or at least such electrodes need not be used during continuous operation of the furnace.

In the glass melting furnace 1 for melting glass, the preheating zone 16, the melting zone 16a, the refining zone 12 with the refining bank 11, and the homogenizing zone 13 are installed in succession between the charging end 6 for the glass raw materials and the throat 10 for the molten glass. The superstructure 4 is formed between two end walls 17, 20, and this chamber is split up by dividing walls 18, 19 with the exception of narrow openings 18a, 19a for the waste gases. The melting zone 16a, the refining zone 12, several burners 22 and the homogenizing zone 13 are all accommodated beneath a common combustion chamber 21 of the superstructure 4. Between the inside face 17a of the first end wall 17 and the vertical center line E of the last dividing wall 19 before the refining zone 12 the first flow path "L1" for the glass is formed, and the second flow path "L2" is formed in the combustion chamber 21 between the vertical center line E and the inside face 20a of the second end wall 20. The ratio of the distance "L2" to the total Length ("L1"+"L2") is chosen to be at least 0.5, preferably 0.53. The distances "L1" and "L2" are the horizontal components of the relevant flow paths.

The majority of the heating energy is introduced into the glass melt in front or upstream of the refining bank 11 of the refining zone 12 in the melting zone 16a, and the heating and melting energy is supplied to the batch by the waste gases from above, and from below only by the current of the glass melt, which extends as far as the charging end 6. Therefore the charging end 6 of the melting tank 3 does not require electrical heating, at least during continuous operation of the furnace.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A method of melting glass in a furnace which has:

(a) a melter with a tank, a tank bottom and a superstructure with a crown, (b) a preheating zone, a melting zone, a refining zone with a refining bank raised above a remainder of the bottom and an homogenizing zone, arranged lengthwise one after another in a direction from a charging end for glass raw materials situated near a first end wall to a second end wall, whereby (c) at least one dividing wall protruding downwards from the crown is provided to shield the radiation of the flame inside the furnace between the first end wall at the charging end and the melting zone, this dividing wall leaving a flow path for waste gases coming from burners so that the glass raw materials in the preheating zone can be heated, and (d) the melting zone, the refining zone, several burners for creating heating and melting energy and the homogenizing zone having a common combustion chamber, the ends of the common combustion chamber being defined by a last of the at least one dividing wall and an inside face of the second end wall, and (e) a first flow path of the glass, with a horizontal component of the length "L1", being formed between an inside face of the first end wall and a vertical center line (E) of the aforementioned last dividing wall before the melting zone, and (f) a second flow path of the glass, with a horizontal component of the length "L2", being formed in the aforementioned combustion chamber between the vertical center line (E) of the aforementioned last dividing wall and the inside face of the second end wall, and whereby (g) a liquid glass convection current from the melting zone in a direction of the charging end and a counter-flow bottom liquid glass current are produced by the creation of a temperature gradient in a glass melt by the addition of heating energy to a glass bath surface by means of burners installed in the combustion chamber, comprising the steps of:

locating the aforementioned last dividing wall such that a ratio of the length of the horizontal component of the second flow path "L2" of the glass melt in the combustion chamber to the combined lengths of the horizontal components of the first and second flow paths of the glass melt ("L1"+"L2") is at least 0.5, introducing heating energy to the glass bath surface within the furnace with at least a greater part of the total heating energy being introduced into the glass melt in the melting zone, and applying the heating and melting energy to the glass raw materials from above from the waste gases, and from below solely from the current in the glass melt which extends as far as the charging end.

2. A method according to claim 1, wherein said step of locating is such that the ratio L2: (L1+L2) is at least 0.53.

3. A method according to claim 1, including the step of assisting said current in said glass melt by gas bubbles from at least one row of bubblers, installed perpendicular to a longitudinal axis of the melting tank, at a distance of 100 to 300 cm in front of the refining bank in the direction of the glass flow.

4. A method according to claim 3, including the step of increasing the energy input into the glass melt in the area around the bubblers by the use of at least two burners installed opposite one another, above said at least one row of bubblers, these at least two burners having a higher capacity than the other burners.

5. In a furnace for melting glass with a melter, having a tank with a tank bottom and a superstructure with a crown, which has (a) a preheating zone, a melting zone, a refining zone with a refining bank raised above a remainder of the bottom and an homogenizing zone, arranged lengthwise one after another in a direction from a charging end for the glass raw materials situated near a first end wall to a second end wall, whereby (b) at least one dividing wall protruding downwards from the crown is provided to shield the radiation of the flame inside the furnace chamber between the first end wall at a charging end and the melting zone, and that a flow path is left free for the passage of waste gases from the burners to the preheating zone for heating the glass raw materials with the waste gases, and (c) the melting zone, the refining zone, several burners and the homogenizing zone have a common combustion chamber in the superstructure, two ends of said common combustion chamber being defined by a last dividing wall of said at least one dividing wall and an inside face of the second end wall, and (d) a first distance "L1" being formed between an inside face of the first end wall and a vertical center line (E) of the aforementioned last dividing wall in front of the melting zone, and (e) a second distance "L2" being formed in the aforementioned combustion chamber between the vertical center line (E) of the aforementioned last dividing wall and the inside face of the second end wall, comprising the improvement wherein said last dividing wall is positioned so that a ratio of the second length "L2" in the combustion chamber to the combined lengths of the first and second distances ("L1"+"L2") between the inside faces of the first and second end walls is at least 0.5, a majority of the burners are installed in the melting zone in front of the refining bank in the refining zone, and the charging end of the tank is not electrically heated.

6. A furnace according to claim 5, wherein the ratio L2:(L1+L2) is at least 0.53.

7. A furnace according to claim 5, wherein at least several pairs of burners are installed opposite one another in both side walls of the combustion chamber, and whereby at least three pairs of burners are installed before a front edge of the refining bank.

8. A furnace according to claim 7, whereby said at least three pair of burners comprises at least four pairs of burners.

9. A furnace according to claim 5, wherein a further dividng wall with an opening for the waste gases from the burners is installed within the first distance "L1" between the first end wall and the last dividing wall, thereby forming two further intermediate chambers in the preheating zone, and at least a further burner pair is installed in both side walls of a second of the intermediate chambers in the direction of the glass flow.

10. A furnace according to claim 5, wherein at least one row of bubblers is installed in the tank at a distance of 100 to 300 cm in front of the refining bank in the glass flow direction.

11. A furnace according to claim 10, wherein at least two burners are installed opposite one another above the at least one row of bubblers, and these at least two burners have a higher capacity than the other burners.

* * * * *